Patented Mar. 29, 1938

2,112,567

UNITED STATES PATENT OFFICE 2,112,567

COMPLEX SALTS OF ZINC HYDROSULPHITE AND 1,2-ALIPHATIC DIAMINES AND PROCESS FOR PREPARING THEM

Emeric Havas, Pitman, N. J., assignor to E. I. du Pont de Nemours & Company, Wilmington, Del., a corporation of Delaware No Drawing. Application May 25, 1937, Serial No. 144,751

4 Claims. (Cl. 260—11)

The present invention relates to complex salts of zinc hydrosulphite and ethylene diamine and its homologs, and to a method for preparing the same. A preferred product, the zinc hydrosulphite-ethylene diamine complex, is represented by the formula:

$$ZnS_2O_4.3(C_2H_8N_2)$$

It is an object of this invention to provide reducing agents in solid form which are more stable than ordinary hydrosulphites, especially in acid medium. A further object is to provide a commercially satisfactory procedure for their preparation.

These objects are accomplished by this invention through interaction of zinc hydrosulphite and ethylene diamine or its homologs, and separation of the reaction product, as more fully set forth in the following description. The procedure of the invention is illustrated in detail by the example here given which shows a preferred mode of operation but is not to be construed as a limitation thereto. Parts mentioned are by weight.

Example 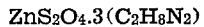

To 1000 parts of technical zinc hydrosulphite solution, which was prepared from zinc dust, water and sulphur dioxide and contained about 45% of zinc hydrosulphite, there were added 450 parts of technical ethylene diamine. The mass was well stirred during the addition, the temperature was kept between 30 and 40° C., and air was excluded as far as possible. When the addition was finished, the reaction vessel was put under vacuum and the water was evaporated until there remained 700 parts of liquid. Next, 1500 parts of alcohol were added with constant stirring while heating to 70° C. Under this treatment the product was transformed to a heavy crystalline mass, which was cooled to room temperature, filtered, washed with alcohol and dried in vacuum.

The product thus obtained corresponded to the formula $ZnS_2O_4.3(C_2H_8N_2)$, and compared with sodium hydrosulphite, showed an improved reducing value per unit of weight as was to be expected from its formula. The complex is not decomposed by weak acids, whether in dry form or in solution. The solution in water remains clear and retains its reducing property even when boiled with diluted acetic acid. Indigo is reduced by it in neutral or weak acetic acid solution to a colorless vat, out of which acetate silk is dyed easily, remaining colorless in the bath, and becoming dark blue after oxidation in the air.

A particular advantage of this new product is its stability and reducing power in weak acid solution. Its use, as previously stated, provides a simple process for the application of indigo on acetate silk.

Homologs of ethylene diamine such as diethylene triamine and tri-ethylene tetramine give similar products, which, however, do not crystallize so well and are more difficult to obtain in a pure state than the ethylene diamine-zinc hydrosulphite complex.

These salts of the homologs of ethylene diamine and zinc hydrosulphite can be prepared as in the example given, using suitable proportions for the particular compound. For example, the complex of zinc hydrosulphite and di-ethylene triamine may be prepared by using the following amounts, and observing the general procedure of the foregoing example:

| | Grams |
|---|---|
| Zinc hydrosulphite solution (45%) | 400 |
| Di-ethylene triamine | 150 |
| Water | 100 |

Only aliphatic 1,2-diamines give useful products. The marked stability of these compounds appears to be due to a peculiar ability of the aliphatic 1,2 diamines to form complexes with zinc hydrosulphite which are not easily decomposed.

Other types of amines comprising ethanolamine, guanidine, and aromatic amines were tried, and it was found that stable addition products with zinc hydrosulphite were not obtained.

Alternatively the preferred reducing agent can be obtained by interaction of sodium hydrosulphite, zinc chloride, and ethylene diamine, but the procedure of the example is more desirable.

Simple evaporation of the zinc hydrosulphite-ethylene diamine mixture does not furnish a stable compound. The treatment with alcohol, as described in the example, is necessary to obtain the product in such crystalline form that it remains stable on exposure to air.

As many apparently widely different embodiments of this invention may be made without departing from the spirit and scope thereof, it is to be understood that I do not limit myself to the specific embodiments thereof except as defined in the appended claims.

I claim:

1. The process of producing complex addition salts of zinc hydrosulphite and aliphatic 1,2 diamines which comprises interacting a solution of zinc hydrosulphite and a member of the group consisting of ethylene diamine and its homologs and subsequently separating the reaction product.

2. The process of producing a complex addition salt of zinc hydrosulphite and ethylene diamine which comprises interacting a solution of zinc hydrosulphite and ethylene diamine and subsequently separating the reaction product.

3. The process of producing a complex addition salt of zinc hydrosulphite and ethylene diamine of the formula $ZnS_2O_4.3(C_2H_8N_2)$, which comprises interacting with exclusion of air, an aqueous solution of zinc hydrosulphite and ethylene-diamine while agitating the mixture and maintaining it at a temperature of 30–40° C., and subsequently precipitating and separating the reaction product.

4. The complex addition salt of zinc hydrosulphite and ethylene-diamine represented by the formula $ZnS_2O_4.3(C_2H_8N_2)$.

EMERIC HAVAS.